(12) United States Patent
Ramsey

(10) Patent No.: US 8,273,560 B2
(45) Date of Patent: Sep. 25, 2012

(54) COATED SUBSTRATES AND METHODS OF PREPARING THE SAME

(75) Inventor: Sally Judith Weine Ramsey, Tallmadge, OH (US)

(73) Assignee: Ecology Coatings, Inc., Warren, MI (US)

( * ) Notice: Subject to any disclaimer, the term of this patent is extended or adjusted under 35 U.S.C. 154(b) by 0 days.

(21) Appl. No.: 13/108,318

(22) Filed: May 16, 2011

(65) Prior Publication Data

US 2012/0028328 A1 Feb. 2, 2012

(51) Int. Cl.
*C12N 11/00* (2006.01)
*C12N 11/16* (2006.01)
*C12N 11/14* (2006.01)
*A23J 1/08* (2006.01)
*A23J 1/09* (2006.01)
*B32B 27/00* (2006.01)
*B32B 27/10* (2006.01)
*B32B 27/14* (2006.01)
*B32B 27/16* (2006.01)

(52) U.S. Cl. ..... 435/174; 435/176; 426/656; 428/423.1; 428/425.1; 428/425.8

(58) Field of Classification Search ................ None
See application file for complete search history.

(56) References Cited

U.S. PATENT DOCUMENTS

| | | | |
|---|---|---|---|
| 5,612,389 A * | 3/1997 | Chabrecek et al. | 522/35 |
| 6,749,868 B1 * | 6/2004 | Desai et al. | 424/491 |
| 2003/0049447 A1 | 3/2003 | Perrier et al. | |
| 2005/0175561 A1 * | 8/2005 | Garti et al. | 424/63 |
| 2006/0073336 A1 | 4/2006 | Zhang et al. | |
| 2007/0116761 A1 | 5/2007 | Desai | |
| 2008/0287551 A1 | 11/2008 | Garti et al. | |

FOREIGN PATENT DOCUMENTS

WO WO-2011-014831 A2 2/2011

OTHER PUBLICATIONS

Li and Haynie, "Multilayer biomimetics: reversible covalent stabilization of a nanostructured biofilm," Biomacromolecules, Aug. 2004, vol. 5(5):1667-1670 (2004).
Rao et al., "Some speciality coatings from radiation curable poly(acrylic) combinations," Progress in Organic Coatings 25(3):221-233 (1995).
PCT/US10/44011 Search Report and Written Opinion mailed Apr. 25, 2011.

* cited by examiner

*Primary Examiner* — Jon P Weber
*Assistant Examiner* — Kailash C Srivastava
(74) *Attorney, Agent, or Firm* — Wilson Sonsini Goodrich & Rosati

(57) ABSTRACT

Disclosed herein are coated articles and methods of preparing the same.

51 Claims, No Drawings

COATED SUBSTRATES AND METHODS OF PREPARING THE SAME

CROSS-REFERENCE

This application claims the benefit of PCT Application No. PCT/US10/44011, filed Jul. 30, 2010, which application is incorporated herein by reference in its entirety.

BACKGROUND OF THE INVENTION

GRAS materials are materials that are regarded by experts as safe for human consumption. GRAS materials are exempt from the Federal Food, Drug, and Cosmetic Act (FFDCA) food additive tolerance requirements. GRAS coatings are coatings that are safe for human consumption. GRAS coatings can be applied to food or applied to food packaging.

SUMMARY OF THE INVENTION

We recognize that there is a need for coating compositions that protect food from outside elements (e.g., moisture and oxidation) and that are safe for human consumption. We further recognize that there is a need for coated articles that protect food from outside elements (e.g., moisture and oxidation) and that can be safely contacted with food. At this time there are very few such coating compositions. Disclosed herein, are coating compositions that protect food from outside elements (e.g., moisture and oxidation) and that are safe for human consumption. Further disclosed herein are coated articles that protect food from outside elements (e.g., moisture and oxidation) and that can be safely contacted with food.

Disclosed herein, in certain embodiments, is a method for preparing a coated article, comprising: (a) coating a substrate with a composition comprising: (i) a polypeptide, wherein the polypeptide is selected from: cysteine, albumin, transferrin, ovomucin, lysozyme, or combinations thereof, and (ii) a denaturing agent; and (b) curing and cross-linking the composition by exposing the composition to shortwave actinic radiation to form a coated article; wherein the temperature of the composition during the curing process is less than about 70° C.; and wherein the composition does not coagulate during the curing process. In some embodiments, the composition further comprises a polar solvent. In some embodiments, the polar solvent is water. In some embodiments, the composition is safe for human consumption, safe for contact with food, or a combination thereof. In some embodiments, the curing comprises exposing the composition to actinic radiation having a wavelength from about 200 nm to about 400 nm. In some embodiments, the curing comprises exposing the composition to actinic radiation having a wavelength of about 280 nm. In some embodiments, the composition further comprises an acid. In some embodiments, the composition further comprises: 2,3-dihydroxysuccinic acid; ethanoic acid; 3-hydroxypentanedioic acid; salts thereof; partial salts thereof; or combinations thereof. In some embodiments, the polar solvent has a pH of about 7 or below. In some embodiments, the composition further comprises a natural gum, a flavoring agent, a dye, a de-foaming agent, or a combination thereof. In some embodiments, the composition further comprises maltodextrin, an oil, or a combination thereof. In some embodiments, the substrate is paper, plastic, metal, food, or a combination thereof. In some embodiments, the polypeptide is provided in the form of a powder.

Disclosed herein, in certain embodiments, is a coated article comprising: (a) a substrate; and (b) a polypeptide composition, wherein the polypeptide composition comprises a polypeptide selected from: cysteine, albumin, transferrin, ovomucin, lysozyme, or combinations thereof coating the substrate; and wherein the polypeptide composition is cross-linked after coating the substrate; and wherein the polypeptide composition is not coagulated. In some embodiments, the polypeptide composition further comprises a polar solvent. In some embodiments, the polypeptide composition further comprises water. In some embodiments, the polypeptide composition further comprises a denaturing agent. In some embodiments, the polypeptide composition is safe for human consumption, safe for contact with food, or a combination thereof. In some embodiments, cross-linking the polypeptide composition comprises exposing the polypeptide composition to shortwave actinic radiation. In some embodiments, cross-linking the polypeptide composition comprises exposing the polypeptide composition to actinic radiation having a wavelength from about 200 nm to about 400 nm. In some embodiments, cross-linking the polypeptide composition comprises exposing the polypeptide composition to actinic radiation having a wavelength of about 280 nm. In some embodiments, the polypeptide composition further comprises an acid. In some embodiments, the polypeptide composition further comprises: 2,3-dihydroxysuccinic acid; ethanoic acid; 3-hydroxypentanedioic acid; salts thereof; partial salts thereof; or combinations thereof. In some embodiments, the polar solvent has a pH of about 7 or below. In some embodiments, the polypeptide composition further comprises a natural gum, a flavoring agent, a dye, a de-foaming agent, or a combination thereof. In some embodiments, the polypeptide composition further comprises maltodextrin, an oil, or a combination thereof. In some embodiments, the substrate is impregnated with the composition. In some embodiments, the substrate is paper, plastic, metal, food, or a combination thereof. In some embodiments, the polypeptide is in the form of a powder.

Disclosed herein, in certain embodiments, is a method for preparing a coated article, comprising: (a) coating a substrate with a composition comprising: (i) a monomer, an oligomer, or a combination thereof, and (i) a polypeptide, wherein the polypeptide is selected from: cysteine, albumin, transferrin, ovomucin, lysozyme, or combinations thereof; and (b) curing and cross-linking the composition by exposing the composition to shortwave actinic radiation to form a coated substrate; wherein the temperature of the composition during the curing process is less than about 70° C.; and wherein the composition does not coagulate during the curing process. In some embodiments, the composition is safe for human consumption, safe for contact with food, or a combination thereof. In some embodiments, the monomer is trimethylolpropane triacrylate (TMPTA), ethoxylated TMPTA (TMPTEOA), tripropylene glycol diacrylate (TRPGDA), or a combination thereof. In some embodiments, the oligomer is epoxy diacrylate. In some embodiments, the composition further comprises: a photoinitiator, a diluent, a surfactant, a pigment dispersion, a natural gum, a dye, a de-foaming agent, or a combination thereof. In some embodiments, the composition further comprises maltodextrin, an oil, or a combination thereof. In some embodiments, the curing comprises exposing the composition to actinic radiation having a wavelength from about 200 nm to about 400 nm. In some embodiments, the curing comprises exposing the composition to actinic radiation having a wavelength of about 280 nm. In some embodiments, coating comprises impregnating the substrate with the composition. In some embodiments, the substrate is paper, plastic, metal, food, or a combination thereof. In some embodiments, the polypeptide is in the form of a powder.

Disclosed herein, in certain embodiments, is a coated article comprising: (a) a substrate; and (b) a composition coating the substrate comprising: (i) a cross-linked monomer, oligomer, or a combination thereof, and (ii) a polypeptide selected from cysteine, albumin, transferrin, ovomucin, lysozyme, or combinations thereof; wherein the composition is cross-linked after coating the substrate, and wherein the composition is not coagulated. In some embodiments, the composition is safe for human consumption, safe for contact with food, or a combination thereof. In some embodiments, the monomer is trimethylolpropane triacrylate (TMPTA), ethoxylated TMPTA (TMPTEOA), tripropylene glycol diacrylate (TRPGDA), or a combination thereof. In some embodiments, the composition further comprises: a diluent, a surfactant, a pigment dispersion, a natural gum, a flavoring agent, a dye, a de-foaming agent, or a combination thereof. In some embodiments, the composition further comprises maltodextrin, an oil, or a combination thereof. In some embodiments, cross-linking the composition comprises exposing the composition to shortwave actinic radiation. In some embodiments, cross-linking the composition comprises exposing the composition to actinic radiation having a wavelength from about 200 nm to about 400 nm. In some embodiments, cross-linking the composition comprises exposing the composition to actinic radiation having a wavelength of about 280 nm. In some embodiments, the substrate is impregnated with the composition. In some embodiments, the substrate is paper, plastic, metal, food, or a combination thereof. In some embodiments, the polypeptide is provided in the form of a powder.

DETAILED DESCRIPTION OF THE INVENTION

Disclosed herein, in certain embodiments, is a method for preparing a coated article, comprising: (a) coating a substrate with a composition comprising: (i) a polypeptide, wherein the polypeptide is selected from: cysteine, albumin, transferrin, ovomucin, lysozyme, or combinations thereof, and (ii) a denaturing agent; and (b) curing and cross-linking the composition by exposing the composition to shortwave actinic radiation to form a coated article; wherein the temperature of the composition during the curing process is less than about 70° C.; and wherein the composition does not coagulate during the curing process. In some embodiments, the composition further comprises a polar solvent. In some embodiments, the polar solvent is water. In some embodiments, the composition is safe for human consumption, safe for contact with food, or a combination thereof. In some embodiments, the curing comprises exposing the composition to actinic radiation having a wavelength from about 200 nm to about 400 nm. In some embodiments, the curing comprises exposing the composition to actinic radiation having a wavelength of about 280 nm. In some embodiments, the composition further comprises an acid. In some embodiments, the composition further comprises: 2,3-dihydroxysuccinic acid; ethanoic acid; 3-hydroxypentanedioic acid; salts thereof partial salts thereof or combinations thereof. In some embodiments, the polar solvent has a pH of about 7 or below. In some embodiments, the composition further comprises a natural gum, a flavoring agent, a dye, a de-foaming agent, or a combination thereof. In some embodiments, the composition further comprises maltodextrin, an oil, or a combination thereof. In some embodiments, the substrate is paper, plastic, metal, food, or a combination thereof. In some embodiments, the polypeptide is provided in the form of a powder.

Disclosed herein, in certain embodiments, is a coated article comprising: (a) a substrate; and (b) a polypeptide composition, wherein the polypeptide composition comprises a polypeptide selected from: cysteine, albumin, transferrin, ovomucin, lysozyme, or combinations thereof coating the substrate; and wherein the polypeptide composition is cross-linked after coating the substrate; and wherein the polypeptide composition is not coagulated. In some embodiments, the polypeptide composition further comprises a polar solvent. In some embodiments, the polypeptide composition further comprises water. In some embodiments, the polypeptide composition further comprises a denaturing agent. In some embodiments, the polypeptide composition is safe for human consumption, safe for contact with food, or a combination thereof. In some embodiments, cross-linking the polypeptide composition comprises exposing the polypeptide composition to shortwave actinic radiation. In some embodiments, cross-linking the polypeptide composition comprises exposing the polypeptide composition to actinic radiation having a wavelength from about 200 nm to about 400 nm. In some embodiments, cross-linking the polypeptide composition comprises exposing the polypeptide composition to actinic radiation having a wavelength of about 280 nm. In some embodiments, the polypeptide composition further comprises an acid. In some embodiments, the polypeptide composition further comprises: 2,3-dihydroxysuccinic acid; ethanoic acid; 3-hydroxypentanedioic acid; salts thereof; partial salts thereof; or combinations thereof. In some embodiments, the polar solvent has a pH of about 7 or below. In some embodiments, the polypeptide composition further comprises a natural gum, a flavoring agent, a dye, a de-foaming agent, or a combination thereof. In some embodiments, the polypeptide composition further comprises maltodextrin, an oil, or a combination thereof. In some embodiments, the substrate is impregnated with the composition. In some embodiments, the substrate is paper, plastic, metal, food, or a combination thereof. In some embodiments, the polypeptide is in the form of a powder.

Disclosed herein, in certain embodiments, is a method for preparing a coated article, comprising: (a) coating a substrate with a composition comprising: (i) a monomer, an oligomer, or a combination thereof, and (i) a polypeptide, wherein the polypeptide is selected from: cysteine, albumin, transferrin, ovomucin, lysozyme, or combinations thereof; and (b) curing and cross-linking the composition by exposing the composition to shortwave actinic radiation to form a coated substrate; wherein the temperature of the composition during the curing process is less than about 70° C.; and wherein the composition does not coagulate during the curing process. In some embodiments, the composition is safe for human consumption, safe for contact with food, or a combination thereof. In some embodiments, the monomer is trimethylolpropane triacrylate (TMPTA), ethoxylated TMPTA (TMPTEOA), tripropylene glycol diacrylate (TRPGDA), or a combination thereof. In some embodiments, the oligomer is epoxy diacrylate. In some embodiments, the composition further comprises: a photoinitiator, a diluent, a surfactant, a pigment dispersion, a natural gum, a dye, a de-foaming agent, or a combination thereof. In some embodiments, the composition further comprises maltodextrin, an oil, or a combination thereof. In some embodiments, the curing comprises exposing the composition to actinic radiation having a wavelength from about 200 nm to about 400 nm. In some embodiments, the curing comprises exposing the composition to actinic radiation having a wavelength of about 280 nm. In some embodiments, coating comprises impregnating the substrate with the composition. In some embodiments, the substrate is paper, plastic, metal, food, or a combination thereof. In some embodiments, the polypeptide is in the form of a powder.

Disclosed herein, in certain embodiments, is a coated article comprising: (a) a substrate; and (b) a composition coating the substrate comprising: (i) a cross-linked monomer, oligomer; or a combination thereof, and (ii) a polypeptide selected from cysteine, albumin, transferrin, ovomucin, lysozyme, or combinations thereof; wherein the composition is cross-linked after coating the substrate, and wherein the composition is not coagulated. In some embodiments, the composition is safe for human consumption, safe for contact with food, or a combination thereof. In some embodiments, the monomer is trimethylolpropane triacrylate (TMPTA), ethoxylated TMPTA (TMPTEOA), tripropylene glycol diacrylate (TRPGDA), or a combination thereof. In some embodiments, the composition further comprises: a diluent, a surfactant, a pigment dispersion, a natural gum, a flavoring agent, a dye, a de-foaming agent, or a combination thereof. In some embodiments, the composition further comprises maltodextrin, an oil, or a combination thereof. In some embodiments, cross-linking the composition comprises exposing the composition to shortwave actinic radiation. In some embodiments, cross-linking the composition comprises exposing the composition to actinic radiation having a wavelength from about 200 nm to about 400 nm. In some embodiments, cross-linking the composition comprises exposing the composition to actinic radiation having a wavelength of about 280 nm. In some embodiments, the substrate is impregnated with the composition. In some embodiments, the substrate is paper, plastic, metal, food, or a combination thereof. In some embodiments, the polypeptide is provided in the form of a powder.

Polypeptides as Self-Linking Components

Disclosed herein, in certain embodiments, is a method for preparing a coated article, comprising: (a) coating a substrate with a composition comprising: (i) a sulfur-containing biological molecule, and (ii) a denaturing agent; and (b) curing and cross-linking the composition by exposing the composition to shortwave actinic radiation to form a coated article; wherein the temperature of the composition during the curing process is less than about 70° C.; and wherein the composition does not coagulate during the curing process. In some embodiments, the sulfur-containing biological molecule is a self-linking component (i.e., it serves as both photoinitiator and the molecule that is cross-linked). In some embodiments, where the sulfur-containing biological molecule is utilized as a self-linking component, the composition does not comprise a monomer, oligomer, or a photoinitiator that is not the aforementioned sulfur-containing biological molecule utilized in the composition.

Disclosed herein, in certain embodiments, is a method for preparing a coated article, comprising: (a) coating a substrate with a composition comprising: (i) a polypeptide, wherein the polypeptide is selected from: cysteine, albumin, transferrin, ovomucin, lysozyme, or combinations thereof, and (ii) a denaturing agent; and (b) curing and cross-linking the composition by exposing the composition to shortwave actinic radiation to form a coated article; wherein the temperature of the composition during the curing process is less than about 70° C.; and wherein the composition does not coagulate during the curing process. In some embodiments, the polypeptide is a self-linking component (i.e., it serves as both photoinitiator and the molecule that is cross-linked). In some embodiments, where the polypeptide is utilized as a self-linking component, the composition does not comprise a monomer, oligomer, or a photoinitiator that is not the aforementioned sulfur-containing biological molecule utilized in the composition.

Disclosed herein, in certain embodiments, is a method for preparing a coated article, comprising: (a) coating a substrate with a composition comprising: (i) a plant-derived sulfur containing compound, and (ii) a denaturing agent; and (b) curing and cross-linking the composition by exposing the composition to shortwave actinic radiation to form a coated article; wherein the temperature of the composition during the curing process is less than about 70° C.; and wherein the composition does not coagulate during the curing process. In some embodiments, the plant-derived sulfur containing compound is a self-linking component (i.e., it serves as both photoinitiator and the molecule that is cross-linked). In some embodiments, where the plant-derived sulfur containing compound is utilized as a self-linking component, the composition does not comprise a monomer, oligomer, or a photoinitiator that is not the aforementioned sulfur-containing biological molecule utilized in the composition.

Further disclosed herein, in certain embodiments, is a coated article comprising: (a) a substrate; and (b) a cross-linked sulfur-containing biological molecule composition coating the substrate; and wherein the composition is not coagulated.

Further disclosed herein, in certain embodiments, is a coated article comprising: (a) a substrate; and (b) a cross-linked polypeptide composition selected from cross-linked albumin, cross-linked transferrin, cross-linked ovomucin, cross-linked lysozyme, or combinations thereof coating the substrate; and wherein the composition is not coagulated.

Further disclosed herein, in certain embodiments, is a coated article comprising: (a) a substrate; and (b) a cross-linked plant-derived sulfur containing compound composition coating the substrate; and wherein the composition is not coagulated.

Polypeptides as Photoinitiators

Disclosed herein, in certain embodiments, is a method for preparing a coated article, comprising: (a) coating a substrate with a composition comprising: (i) a monomer, an oligomer, or a combination thereof, and (ii) a sulfur-containing biological molecule; and (b) curing and cross-linking the composition by exposing the composition to shortwave actinic radiation to form a coated substrate; wherein the temperature of the composition during the curing process is less than about 70° C.; and wherein the composition does not coagulate during the curing process. In some embodiments, the sulfur-containing biological molecule is utilized as a photoinitiator. In some embodiments, the sulfur-containing biological molecule is utilized as a booster with an additional photoinitiator.

Disclosed herein, in certain embodiments, is a method for preparing a coated article, comprising: (a) coating a substrate with a composition comprising: (i) a monomer, an oligomer, or a combination thereof, and (ii) a polypeptide, wherein the polypeptide is selected from: cysteine, albumin, transferrin, ovomucin, lysozyme, or combinations thereof; and (b) curing and cross-linking the composition by exposing the composition to shortwave actinic radiation to form a coated substrate; wherein the temperature of the composition during the curing process is less than about 70° C.; and wherein the composition does not coagulate during the curing process. In some embodiments, the polypeptide is utilized as a photoinitiator. In some embodiments, the polypeptide is utilized as a booster with an additional photoinitiator.

Disclosed herein, in certain embodiments, is a method for preparing a coated article, comprising: (a) coating a substrate with a composition comprising: (i) a monomer, an oligomer, or a combination thereof, and (ii) a plant-derived sulfur-containing compound, wherein the plant-derived sulfur-containing compound is derived from: a garlic love, an onion, a leek, or combinations thereof; and (b) curing and cross-linking the composition by exposing the composition to shortwave actinic radiation to form a coated substrate; wherein the temperature of the composition during the curing process is less than about 70° C.; and wherein the composition does not coagulate during the curing process. In some embodiments, the plant-derived sulfur-containing compound is utilized as a photoinitiator. In some embodiments, the plant-derived sulfur-containing compound is utilized as a booster with an additional photoinitiator.

Further disclosed herein, in certain embodiments, is a coated article comprising: (a) a substrate; and (b) a composition coating the substrate comprising: (i) a cross-linked monomer, oligomer, or a combination thereof, and (ii) a sulfur-containing biological molecule; and wherein the composition is not coagulated.

Further disclosed herein, in certain embodiments, is a coated article comprising: (a) a substrate; and (b) a composition coating the substrate comprising: (i) a cross-linked monomer, oligomer, or a combination thereof, and (ii) a polypeptide selected from cysteine, albumin, transferrin, ovomucin, lysozyme, or combinations thereof; and wherein the composition is not coagulated.

Further disclosed herein, in certain embodiments, is a coated article comprising: (a) a substrate; and (b) a composition coating the substrate comprising: (i) a cross-linked monomer, oligomer, or a combination thereof, and (ii) a plant-derived sulfur-containing compound derived from: a garlic clove, an onion, a leek or combinations thereof; and wherein the composition is not coagulated.

Recognized as Safe for Human Consumption

In some embodiments, a coating composition disclosed herein is safe for human consumption or safe for contact with food. In some embodiments, a coating or coated article is classified as GRAS. As used herein, "GRAS" or "Generally Regarded as Safe" means an FDA designated substance that is considered safe for human consumption and is thus exempted from the Federal Food, Drug, and Cosmetic Act (FFDCA) food additive tolerance requirements.

Where the coating or coated article is intended to be safe for human consumption or safe for contact with food, all components must be safe for human consumption or safe for contact with food. In some embodiments, the sulfur-containing biological molecule and substrate are safe for human consumption or safe for contact with food. In some embodiments, the polypeptide and substrate are safe for human consumption or safe for contact with food. In some embodiments, the plant-derived sulfur-containing compound and substrate are safe for human consumption or safe for contact with food. Where the coating composition further comprises a denaturing agent, the denaturing agent is safe for human consumption or safe for contact with food. Where the coating composition further comprises a monomer and/or oligomer, the monomer and/or oligomer is safe for human consumption or safe for contact with food. Wherein the coating composition further comprises an additional component selected from: a nano-filler, a diluent, a surfactant, a pigment dispersion, a natural gum, a flavoring agent, a dye, a de-foaming agent, or a combination thereof; the additional component is safe for human consumption or safe for contact with food.

Where the coating or coated article is not intended to be safe for human consumption or safe for contact with food, none of the components must be safe for human consumption or safe for contact with food. Where the coating or coated article is not intended to be GRAS, any of the components may be safe for human consumption or safe for contact with food.

Sulfur-Containing Biological Molecules

Disclosed herein, in certain embodiments, is a method for preparing a coated article, comprising: (a) coating a substrate with a composition comprising: (i) a sulfur-containing biological molecule, and (ii) a denaturing agent; and (b) curing and cross-linking the composition by exposing the composition to shortwave actinic radiation to form a coated article; wherein the temperature of the composition during the curing process is less than about 70° C.; and wherein the composition does not coagulate during the curing process.

Disclosed herein, in certain embodiments, is a method for preparing a coated article, comprising: (a) coating a substrate with a composition comprising: (i) a monomer, an oligomer, or a combination thereof, and (ii) a sulfur-containing biological molecule; and (b) curing and cross-linking the composition by exposing the composition to shortwave actinic radiation to form a coated substrate; wherein the temperature of the composition during the curing process is less than about 70° C.; and wherein the composition does not coagulate during the curing process.

As used herein, "sulfur-containing biological molecule" means a molecule (e.g., a polypeptide, an amino acid) that is obtained from a natural source (e.g., a plant, or an animal). In some embodiments, the sulfur-containing biological molecule is derived from an animal. In some embodiments, the sulfur containing molecule is derived from albumen. In some embodiments, the sulfur-containing biological molecule is derived from a plant.

In some embodiments, the sulfur-containing biological molecule is a sulfur containing amino acid. In some embodiments, the sulfur-containing molecule is cysteine. In some embodiments, the sulfur-containing biological molecule is any biological (e.g., naturally-occurring) molecule with a thiol group (also known as a sulfhydryl group). As used herein, a thiol group means a functional group composed of a sulfur atom and a hydrogen atom (—SH). In some embodiments, the sulfur-containing biological molecule is any polypeptide with a thiol group. In some embodiments, the sulfur-containing biological molecule is any naturally-occurring molecule with a cysteine. In some embodiments, the sulfur-containing biological molecule is any naturally-occurring polypeptide with a cysteine.

In some embodiments, the sulfur-containing biological molecule is safe for human consumption or safe for contact with food. In some embodiments, the sulfur-containing biological molecule is found on the list of GRAS components issued by the FDA.

In some embodiments, the sulfur-containing biological molecule is a polypeptide obtained from albumen. In some embodiments, the sulfur-containing biological molecule is a polypeptide selected from: albumin, transferrin, ovomucin, lysozyme, or combinations thereof. In some embodiments, the sulfur-containing biological molecule is a polypeptide selected from: albumin, transferrin, and ovomucin. In some embodiments, the sulfur-containing biological molecule is a polypeptide selected from: albumin and transferrin. In some embodiments, the sulfur-containing biological molecule is a polypeptide selected from: albumin and ovomucin. In some embodiments, the sulfur-containing biological molecule is a polypeptide selected from: albumin and lysozyme. In some embodiments, the sulfur-containing biological molecule is a polypeptide selected from: transferrin and ovomucin. In some embodiments, the sulfur-containing biological molecule is a polypeptide selected from: transferrin and lysozyme. In some embodiments, the sulfur-containing biological molecule is a polypeptide selected from: ovomucin and lysozyme. In some embodiments, the sulfur-containing biological molecule is albumin. In some embodiments, the sulfur-containing biological molecule is ovomucin. In some embodiments, the sulfur-containing biological molecule is transferrin. In some embodiments, the sulfur-containing biological molecule is lysozyme. In some embodiments, the sulfur-containing biological molecule is cysteine.

In some embodiments, the sulfur-containing biological molecule is obtained from a plant. In some embodiments, the sulfur-containing biological molecule is obtained from an onion. In some embodiments, the sulfur-containing biological molecule is obtained from a leek. In some embodiments, the sulfur-containing biological molecule is obtained from garlic.

In some embodiments, the sulfur-containing biological molecule is dehydrated before being used to make a coating disclosed herein. In some embodiments, the sulfur-containing biological molecule is provided in the form of a powder (e.g., the sulfur-containing biological molecule is contained within powdered albumen). In some embodiments, the sulfur-containing biological molecule is provided as a lyophilized powder. In some embodiments, the sulfur-containing biological molecule is pasteurized before being dehydrated.

In some embodiments, the sulfur-containing biological molecule comprises about 99% w/w of the coating composition. In some embodiments, the sulfur-containing biological molecule comprises about 98% w/w of the coating composition. In some embodiments, the sulfur-containing biological molecule comprises about 97% w/w of the coating composition. In some embodiments, the sulfur-containing biological molecule comprises about 96% w/w of the coating composition. In some embodiments, the sulfur-containing biological molecule comprises about 95% w/w of the coating composition. In some embodiments, the sulfur-containing biological molecule comprises about 94% w/w of the coating composition. In some embodiments, the sulfur-containing biological molecule comprises about 93% w/w of the coating composition. In some embodiments, the sulfur-containing biological molecule comprises about 92% w/w of the coating composition. In some embodiments, the sulfur-containing biological molecule comprises about 91% w/w of the coating composition. In some embodiments, the sulfur-containing biological molecule comprises about 90% w/w of the coating composition. In some embodiments, the sulfur-containing biological molecule comprises about 85% w/w of the coating composition. In some embodiments, the sulfur-containing biological molecule comprises about 80% w/w of the coating composition. In some embodiments, the sulfur-containing biological molecule comprises about 75% w/w of the coating composition. In some embodiments, the sulfur-containing biological molecule comprises about 70% w/w of the coating composition. In some embodiments, the sulfur-containing biological molecule comprises about 65% w/w of the coating composition. In some embodiments, the sulfur-containing biological molecule comprises about 60% w/w of the coating composition. In some embodiments, the sulfur-containing biological molecule comprises about 50% w/w of the coating composition. In some embodiments, the sulfur-containing biological molecule comprises about 40% w/w of the coating composition. In some embodiments, the sulfur-containing biological molecule comprises about 30% w/w of the coating composition.

In some embodiments, the polypeptide comprises about 99% w/w of the coating composition. In some embodiments, the polypeptide comprises about 98% w/w of the coating composition. In some embodiments, the polypeptide comprises about 97% w/w of the coating composition. In some embodiments, the polypeptide comprises about 96% w/w of the coating composition. In some embodiments, the polypeptide comprises about 95% w/w of the coating composition. In some embodiments, the polypeptide comprises about 94% w/w of the coating composition. In some embodiments, the polypeptide comprises about 93% w/w of the coating composition. In some embodiments, the polypeptide comprises about 92% w/w of the coating composition. In some embodiments, the polypeptide comprises about 91% w/w of the coating composition. In some embodiments, the polypeptide comprises about 90% w/w of the coating composition. In some embodiments, the polypeptide comprises about 85% w/w of the coating composition. In some embodiments, the polypeptide comprises about 80% w/w of the coating composition. In some embodiments, the polypeptide comprises about 75% w/w of the coating composition. In some embodiments, the polypeptide comprises about 70% w/w of the coating composition. In some embodiments, the polypeptide comprises about 65% w/w of the coating composition. In some embodiments, the polypeptide comprises about 60% w/w of the coating composition. In some embodiments, the polypeptide comprises about 50% w/w of the coating composition. In some embodiments, the polypeptide comprises about 40% w/w of the coating composition. In some embodiments, the polypeptide comprises about 30% w/w of the coating composition.

In some embodiments, the plant-derived sulfur containing compound comprises about 99% w/w of the coating composition. In some embodiments, the plant-derived sulfur containing compound comprises about 98% w/w of the coating composition. In some embodiments, the plant-derived sulfur containing compound comprises about 97% w/w of the coating composition. In some embodiments, the plant-derived sulfur containing compound comprises about 96% w/w of the coating composition. In some embodiments, the plant-derived sulfur containing compound comprises about 95% w/w of the coating composition. In some embodiments, the plant-derived sulfur containing compound comprises about 94% w/w of the coating composition. In some embodiments, the plant-derived sulfur containing compound comprises about 93% w/w of the coating composition. In some embodiments, the plant-derived sulfur containing compound comprises about 92% w/w of the coating composition. In some embodiments, the plant-derived sulfur containing compound comprises about 91% w/w of the coating composition. In some embodiments, the plant-derived sulfur containing compound comprises about 90% w/w of the coating composition. In some embodiments, the plant-derived sulfur containing compound comprises about 85% w/w of the coating composition. In some embodiments, the plant-derived sulfur containing compound comprises about 80% w/w of the coating composition. In some embodiments, the plant-derived sulfur containing compound comprises about 75% w/w of the coating composition. In some embodiments, the plant-derived sulfur containing compound comprises about 70% w/w of the coating composition. In some embodiments, the plant-derived sulfur containing compound comprises about 65% w/w of the coating composition. In some embodiments, the plant-derived sulfur containing compound comprises about 60% w/w of the coating composition. In some embodiments, the plant-derived sulfur containing compound comprises about 50% w/w of the coating composition. In some embodiments, the plant-derived sulfur containing compound comprises about 40% w/w of the coating composition. In some embodiments, the plant-derived sulfur containing compound comprises about 30% w/w of the coating composition.

Denaturing Agents

In some embodiments, the sulfur-containing biological molecule is denatured such that the thiol groups are exposed. In some embodiments, the polypeptide is denatured such that the thiol groups are exposed. In some embodiments, the plant-derived sulphur containing compound is denatured such that the thiol groups are exposed. In some embodiments, the sulfur-containing biological molecule is denatured by an agent (i.e., the denaturing agent) that is safe for human consumption or safe for contact with food. In some embodiments, the polypeptide is denatured by an agent (i.e., the denaturing agent) that is safe for human consumption or safe for contact with food. In some embodiments, the plant-derived sulphur containing compound is denatured by an agent (i.e., the denaturing agent) that is safe for human consumption or safe for contact with food. In some embodiments, the denaturing agent is found on the list of GRAS components issued by the FDA.

In some embodiments, the denaturing agent is an acid. In some embodiments, the denaturing agent is 2,3-dihydroxysuccinic acid (also known as tartaric acid); ethanoic acid (also known as acetic acid); 3-hydroxypentanedioic acid (also known as citric acid); salts thereof; partial salts thereof; or combinations thereof. In some embodiments, the denaturing agent is vinegar. In some embodiments, the denaturing agent is lemon juice. In some embodiments, the denaturing agent is a compound with the formula $KC_4H_5O_6$ (also known as potassium bitartrate, also known as potassium hydrogen tartrate, also known as Cream of Tartar).

In some embodiments, the denaturing agent comprises about 20% w/w of the coating composition. In some embodiments, the denaturing agent comprises about 15% w/w of the coating composition. In some embodiments, the denaturing agent comprises about 10% w/w of the coating composition. In some embodiments, the denaturing agent comprises about 9% w/w of the coating composition. In some embodiments, the denaturing agent comprises about 8% w/w of the coating composition. In some embodiments, the denaturing agent comprises about 7% w/w of the coating composition. In some embodiments, the denaturing agent comprises about 6% w/w of the coating composition. In some embodiments, the denaturing agent comprises about 5% w/w of the coating composition. In some embodiments, the denaturing agent comprises about 4% w/w of the coating composition. In some embodiments, the denaturing agent comprises about 3% w/w of the coating composition. In some embodiments, the denaturing agent comprises about 2% w/w of the coating composition. In some embodiments, the denaturing agent comprises about 1% w/w of the coating composition.

Solvents

In some embodiments, the composition further comprises a polar solvent. As used herein, a "polar solvent" is a solvent that is able to dissolve a dipolar or charged solute.

In some embodiments, the solvent is safe for human consumption or safe for contact with food. In some embodiments, the solvent is GRAS according to the FDA.

In some embodiments, the polar solvent is water. In some embodiments, the polar solvent is an alcohol. In some embodiments, the polar solvent is ethanol. In some embodiments, the polar solvent is a glycol. In some embodiments, the polar solvent is a combination of water and ethanol. In some embodiments, the polar solvent is a combination of water and glycol. In some embodiments, the polar solvent is a combination of ethanol and glycol.

In some embodiments, the polar solvent has a pH from about 2 to about 7. In some embodiments, the polar solvent has a pH of about 7 or below. In some embodiments, the polar solvent has a pH of about 6 or below. In some embodiments, the polar solvent has a pH of about 5 or below. In some embodiments, the polar solvent has a pH of about 4 or below. In some embodiments, the polar solvent has a pH of about 3 or below.

In some embodiments, the polar solvent comprises about 90% w/w of the coating composition. In some embodiments, the polar solvent comprises about 85% w/w of the coating composition. In some embodiments, the polar solvent comprises about 84% w/w of the coating composition. In some embodiments, the polar solvent comprises about 83% w/w of the coating composition. In some embodiments, the polar solvent comprises about 82% w/w of the coating composition. In some embodiments, the polar solvent comprises about 81% w/w of the coating composition. In some embodiments, the polar solvent comprises about 80% w/w of the coating composition. In some embodiments, the polar solvent comprises about 75% w/w of the coating composition. In some embodiments, the polar solvent comprises about 70% w/w of the coating composition. In some embodiments, the polar solvent comprises about 60% w/w of the coating composition. In some embodiments, the polar solvent comprises about 50% w/w of the coating composition.

Monomers

In certain embodiments, the sulfur-containing biological molecule in a coating composition disclosed herein is utilized as a photoinitiator in combination with a second photoinitiator. In certain embodiments, the polypeptide in a coating composition disclosed herein is utilized as a photoinitiator in combination with a second photoinitiator. In certain embodiments, the plant-derived sulfur containing compound in a coating composition disclosed herein is utilized as a photoinitiator in combination with a second photoinitiator. In some embodiments, where the sulfur-containing biological molecule in a coating composition disclosed herein is utilized as a photoinitiator in combination with a second photoinitiator, the composition further comprises a monomer, an oligomer, or a combination thereof. In some embodiments, where the polypeptide in a coating composition disclosed herein is utilized as a photoinitiator in combination with a second photoinitiator, the composition further comprises a monomer, an oligomer, or a combination thereof. In some embodiments, where the plant-derived sulfur-containing compound in a coating composition disclosed herein is utilized as a photoinitiator in combination with a second photoinitiator, the composition further comprises a monomer, an oligomer, or a combination thereof. In some embodiments, where the sulfur-containing biological molecule composition is utilized as a self-linking component, the composition does not comprise a monomer, an oligomer, or a combination thereof. In some embodiments, where the polypeptide composition is utilized as a self-linking component, the composition does not comprise a monomer, an oligomer, or a combination thereof. In some embodiments, where the plant-derived sulfur-containing compound composition is utilized as a self-linking component, the composition does not comprise a monomer, an oligomer, or a combination thereof.

In certain embodiments, a coating composition disclosed herein comprises at least one monomer, monomeric unit (e.g., in a polymer or oligomer formed from a mono-functional monomer), oligomer, or a combination thereof. In one embodiment, a coating composition disclosed herein comprises a combination of monomers, monomeric units, and/or oligomers. In certain embodiments, upon exposure to a source of actinic radiation, such as ultraviolet light, and in the presence of a photo-initiator, monomers described are rapidly polymerized to form oligomers comprising monomeric units of the monomers described. Thus, depending on the extent of polymerization, compositions herein may comprise momomeric units in the form of monomers, oligomers, or monomers and oligomers.

Where the coating or coated article is intended to be safe for human consumption or safe for contact with food, any monomer utilized must be safe for human consumption or safe for contact with food. In some embodiments, the monomer is a GRAS monomer. In some embodiments, the monomer is trimethylolpropane triacrylate (TMPTA), ethoxylated TMPTA (TMPTEOA), tripropylene glycol diacrylate (TRPGDA), or a combination thereof.

Where the coating or coated article is not intended to be safe for human consumption or safe for contact with food, any monomer may be utilized. In some embodiments, the monomer is: 2-phenoxyethyl acrylate, isobornyl acrylate, acrylate ester derivatives, methacrylate ester derivatives, tetrahydrofurfuryl acrylate, trimethylolpropane triacrylate, 2-phenoxyethyl acrylate esters, or combinations thereof.

In some embodiments, the monomer, monomeric unit, and/or oligomer is present in a coating composition disclosed herein in any suitable amount. In some embodiments, the monomer, monomeric unit, and/or oligomer comprises about 50% w/w of the coating composition. In some embodiments, the monomer, monomeric unit, and/or oligomer comprises about 40% w/w of the coating composition. In some embodiments, the monomer, monomeric unit, and/or oligomer comprises about 30% w/w of the coating composition. In some embodiments, the monomer, monomeric unit, and/or oligomer comprises about 20% w/w of the coating composition. In some embodiments, the monomer, monomeric unit, and/or oligomer comprises about 15% w/w of the coating composition. In some embodiments, the monomer, monomeric unit, and/or oligomer comprises about 10% w/w of the coating composition. In some embodiments, the monomer, monomeric unit, and/or oligomer comprises about 9% w/w of the coating composition. In some embodiments, the monomer, monomeric unit, and/or oligomer comprises about 8% w/w of the coating composition. In some embodiments, the monomer, monomeric unit, and/or oligomer comprises about 7% w/w of the coating composition. In some embodiments, the monomer, monomeric unit, and/or oligomer comprises about 6% w/w of the coating composition. In some embodiments, the monomer, monomeric unit, and/or oligomer comprises about 5% w/w of the coating composition. In some embodiments, the monomer, monomeric unit, and/or oligomer comprises about 4% w/w of the coating composition. In some embodiments, the monomer, monomeric unit, and/or oligomer comprises about 3% w/w of the coating composition. In some embodiments, the monomer, monomeric unit, and/or oligomer comprises about 2% w/w of the coating composition. In some embodiments, the monomer, monomeric unit, and/or oligomer comprises about 1% w/w of the coating composition.

In an embodiment, a coating composition disclosed herein comprises TMPTA in any suitable amount (e.g., from about 50% to about 1% w/w/). In an embodiment, a composition disclosed herein comprises TMPTEOA in any suitable amount (e.g., from about 50% to about 1% w/w/). In an embodiment, a coating composition disclosed herein comprises TRPGDA in any suitable amount (e.g., from about 50% to about 1% w/w/).

Substrates

In some embodiments, the composition is coated onto a substrate or article. In some embodiments, substrate or article is a paper, a plastic, a metal, or a food article.

In some embodiments, the substrate or article is a paper. As used herein, "paper" means any article made from plant fibers (e.g., cellulose). In some embodiments, the paper is made from wood (e.g., spruce, pine, fir, larch and hemlock, and hardwoods such as eucalyptus, aspen and birch). In some embodiments, the paper is made from papyrus. In some embodiments, the paper is made from cotton. In some embodiments, the paper is made from flax. In some embodiments, the paper is made from abacá.

In some embodiments, the paper is paperboard. In some embodiments, the paper is cardboard. In some embodiments, the paper is kraft paper. In some embodiments, the paper is manila paper. In some embodiments, the paper is sack paper.

In some embodiments, the substrate or article is a plastic. As used herein, "plastic" means any article made from a synthetic or semisynthetic organic amorphous solid material. In some embodiments, the plastic is made from the polymerization of acrylic monomers, polyester monomers, silicone monomers, polyurethane monomers, or combinations thereof. In some embodiments, the plastic is a thermoplastic. In some embodiments, the plastic is a thermoset.

In some embodiments, the substrate or article is a metal. In some embodiments, the article is a metal alloy. In some embodiments, the metal is sodium, potassium, calcium, magnesium, aluminum, nickle, copper, iron, silver, platinum, gold, or combinations thereof.

In some embodiments, the substrate or article is food. As used herein, "food" means any article that is intended to be consumed by a mammal, especially a human. In some embodiments, the food is a fruit (e.g., an apple, a peach, a strawberry, a cherry). In some embodiments, the food is a dried fruit. In some embodiments, the food is a vegetable (e.g., a cucumber, a zucchini, a squash). In some embodiments, the food is a dried vegetable. In some embodiments, the food is a meat (e.g., chicken, pork, beef, or fish). In some embodiments, the food is a candy. In some embodiments, the food is a baked good (e.g., a cookie, a bread, a doughnut, or a pastry).

Application

In some embodiments, the coating composition is applied onto the outside of the substrate or article. In some embodiments, the coating is impregnated into the substrate or article.

Compositions maybe applied to substrates by means of spraying, brushing, rolling, dipping, blade coating, curtain coating or a combination thereof. For example, the means of spraying can include, but is not limited to, the use of a High Volume Low Pressure (HVLP) spraying systems, air-assisted/airless spraying systems, or electrostatic spraying systems.

Curing

In some embodiments, regardless of the light source, the emission spectra of the lamp must overlap the absorbance spectrum of the photo-initiator.

In some embodiments, the curing comprises exposing the composition to actinic radiation having a wavelength from about 200 nm to about 400 nm. In some embodiments, the curing comprises exposing the composition to actinic radiation having a wavelength of about 280 nm.

Light sources used for UV curing include arc lamps, such as carbon arc lamps, xenon arc lamps, mercury vapor lamps, tungsten halide lamps, lasers, the sun, sunlamps, and fluorescent lamps with ultra-violet light emitting phosphors. Medium pressure mercury and high pressure xenon lamps have various emission lines at wavelengths which are absorbed by most commercially available photo-initiators. In addition, mercury arc lamps can be doped with iron or gallium. Alternatively, lasers are monochromatic (single wavelength) and can be used to excite photo-initiators which absorb at wavelengths that are too weak or not available when using arc lamps. For instance, medium pressure mercury arc lamps have intense emission lines at 254 nm, 265 nm, 295 nm, 301 nm, 313 nm, 366 nm, 405/408 nm, 436 nm, 546 nm, and 577/579 nm. Therefore, a photo-initiator with an absorbance maximum at 350 nm may not be a efficiently excited using a medium pressure mercury arc lamp, but could be efficiently initiated using a 355 nm Nd:YVO4 (Vanadate) solid-state lasers. Commercial UV/Visible light sources with varied spectral output in the range of 250-450 nm may be used directly for curing purposes; however wavelength selection can be achieved with the use of optical bandpass or longpass filters. Therefore, as described herein, the user can take advantage of the optimal photo-initiator absorbance characteristics.

In some embodiments, curing of a coating composition disclosed herein is achieved in any suitable amount of time. In further or alternative embodiments, the time period for exposing a coating composition disclosed herein to actinic radiation is less than 2 minutes. In further embodiments, the time period for exposing a coating composition disclosed herein to actinic radiation is less than 1 minute. In further embodiments, the time the time period for exposing a coating composition disclosed herein to actinic radiation is less than 15 seconds.

A coating composition disclosed herein can optionally be exposed to two sources of actinic radiation (e.g., for any suitable amount of time). In further or alternative embodiments, the time between the first actinic radiation step and the second actinic radiation step is less than 2 minutes. In further embodiments, the time between the first actinic radiation step and the second actinic radiation step is less than 1 minute. In further embodiments, the time between the first actinic radiation step and the second actinic radiation step is less than 15 seconds.

Further curing and applications methods are set forth in WO 2007/040493, which is hereby incorporated by reference in its entirety.

In some embodiments, the temperature of the coating during curing does not exceed 100° C. In some embodiments, the temperature of the coating during curing does not exceed 90° C. In some embodiments, the temperature of the coating during curing does not exceed 80° C. In some embodiments, the temperature of the coating during curing does not exceed 75° C. In some embodiments, the temperature of the coating during curing does not exceed 70° C. In some embodiments, the temperature of the coating during curing does not exceed 65° C. In some embodiments, the temperature of the coating during curing does not exceed 60° C. In some embodiments, the temperature of the coating during curing does not exceed 55° C. In some embodiments, the temperature of the coating during curing does not exceed 50° C. In some embodiments, the temperature of the coating during curing does not exceed 45° C. In some embodiments, the temperature of the coating during curing does not exceed 40° C. In some embodiments, the temperature of the coating during curing does not exceed 39° C. In some embodiments, the temperature of the coating during curing does not exceed 38° C. In some embodiments, the temperature of the coating during curing does not exceed 37° C.

Additional Components

Where the sulfur-containing biological molecule (e.g., polypeptide or plant-derived sulfur containing compound) is utilized as a photoinitiator in combination with a second photoinitiator, in some embodiments, the composition further comprises a nano-filler, a photoinitiator, a surfactant, a diluent, a pigment or pigment dispersion, or a combination thereof. In some embodiments, where the sulfur-containing biological molecule (e.g., polypeptide or plant-derived sulfur containing compound) is utilized as a self-linking component, the composition does not comprise a nano-filler, a photoinitiator, a surfactant, a diluent, a pigment or pigment dispersion, or a combination thereof.

Nano-Fillers

Where the coating or coated article is intended to be safe for human consumption or safe for contact with food, any nano-filler utilized must be safe for human consumption or safe for contact with food.

In certain embodiments, a coating composition disclosed herein further comprises a nano-filler. In various embodiments, nano-fillers comprise insoluble inorganic particles, and/or insoluble organic particles. The inorganic nano-fillers are generally metal oxides, although other inorganic compounds can be used. Examples of inorganic nano-fillers include aluminum nitrides, aluminum oxides, antimony oxides, barium sulfates, bismuth oxides, cadmium selenides, cadmium sulfides, calcium sulfates, cerium oxides, chromium oxides, copper oxides, indium tin oxides, iron oxides, lead chromates, nickel titanates, niobium oxides, rare earth oxides, silicas, silicon dioxides, silver oxides, tin oxides, titanium dioxides, zinc chromates, zinc oxides, zinc sulfides, zirconium dioxides, and zirconium oxides. Alternatively, organic nano-fillers are generally polymeric materials ground into appropriate sized particulates. Examples of nanometer sized organic nano-fillers include, but are not limited to, nano-polytetrafluoroethylene, acrylate nanosphere colloids, methacrylate nanosphere colloids, and combinations thereof, although micron sized fillers of the polytetrafluoroethylene, acrylate, methacrylate, and combinations thereof may be used.

In one embodiment, a coating composition disclosed herein further comprises nano-alumina. Nano-alumina is composed of high purity aluminum oxide that is of nanometer size, including by way of example less than 200 nm, and within the range of approximately 5-40 nanometer discrete spherical particles. In a specific embodiment, a coating composition disclosed herein further comprises nano-silicon dioxide (nano-silica, e.g., C 155: 50/50 nanosilica and propoxylated glyceryl triacrylate). Representative nano-silicon dioxides include those sold under the name Nanocryl® C by Hanse Chemie (Geesthacht, Germany), such as Nanocryl® C 350, Nanocryl® C 130, Nanocryl® C 140, Nanocryl® C 145, Nanocryl® C 146, Nanocryl® C 150, Nanocryl® C 153, Nanocryl® C 155, Nanocryl® C 165. In a specific embodiment, Nanocryl® C 155 is included in the present compositions.

Nano-silicon dioxides having a nanometer size, including by way of example less than about 200 nm, and by way of further example, with an average particle size 5 to 40 nm, can be incorporated into compositions. Addition of nano-silicon dioxides may impart improved toughness, hardness and abrasion and scratch resistance.

Other materials that may be used as nano-fillers include: oxides, carbides, nitrides, borides, silicates, ferrites and titanates. For instance, examples of such nano-fillers are, but not limited to, nano-zirconium oxide, nano-zirconium dioxides, nano-silicon carbide, nano-silicon nitride, nano-sialon (silicon aluminum oxynitride), nano-aluminum nitrides, nano-bismuth oxides, nano-cerium oxides, nano-copper oxides, nano-iron oxides, nano-nickel titanates, nano-niobium oxides, nano-rare earth oxides, nano-silver oxides, nano-tin oxides, and nano-titanium oxides. These materials have relatively high mechanical strength at high temperatures.

Alternatively, nano-fillers used in the composition described herein include amorphous silicon dioxide prepared with polyethylene wax, synthetic amorphous silica with organic surface treatment, untreated amorphous silicon dioxide, alkyl quaternary bentonite, colloidal silica, acrylated colloidal silica, alumina, zirconia, zinc oxide, niobia, titania aluminum nitride, silver oxide, cerium oxides, and combinations thereof. The silicon dioxides are chosen from a group consisting of both synthetic and natural silicon dioxides with surface treatments including polyethylene wax or waxes and IRGANOX® from Ciba Specialty Chemicals 540 White Plains Road, Tarrytown, N.Y., U.S.A.

The average particle size of nano-fillers in the compositions described herein includes by way of example less than about 20 μm, and by way of further example, with an average particle size 1 to 10 μm discrete particles; whereas, the average particle size of nano-filler particles includes by way of example less than about 200 nm, and by way of further example, with an average particle size 5 to 50 nm discrete particles. In an embodiment, nano-filler particles have an average diameter of 10, 20, 30, or 40 nm. Furthermore, in another embodiment, the particle size distribution of nano-filler particles ranges from 1 nm to 60 nm, such as from 5 nm to 30 nm.

Nano-fillers are present in a coating composition disclosed herein in an amount ranging from 10 to 60% wt/wt, such as from 25 to 55% wt/wt, 30 to 50% wt/wt, or 30 to 40% wt/wt. In an embodiment, a coating composition disclosed herein comprises from 31-36% wt/wt of nanofiller.

Photo-Initiators

In a further or alternative embodiment, a coating composition disclosed herein further comprises at least one photo-initiator. In a further or alternative embodiment, a coating composition disclosed herein further comprises at least two photo-initiators. In further or alternative embodiment, a coating composition disclosed herein further comprises at least three photo-initiators.

Generally, photo-initiators are added to initiate rapid polymerization of monomers in the composition upon exposure to a source of actinic radiation, such as ultraviolet light. The photo-initiator can be matched to the spectral properties of the UV source, such as medium pressure mercury arc lights which produce intense UV-C (200-280 nm) radiation, doped mercury discharge lamps which produce UV-A (315-400 nm) radiation, or UV-B (280-315 nm) radiation depending on the dopant, or combination of lamp types. Depending on the photo-initiator or combination of photo-initiators in the composition, varying UV source(s) may be employed.

Any suitable type of photo-initiator may be used in the composition, including those categorized as free radicals. The photo-initiator may be in liquid or solid form.

Furthermore, combinations of photo-initiators may be used which encompass different spectral properties of the UV sources used to initiate polymerization.

Where the coating or coated article is intended to be safe for human consumption or safe for contact with food, any photoinitiator utilized must be safe for human consumption or safe for contact with food. In some embodiments, the photoinitiator is a GRAS photoinitiator. In some embodiments, the photoinitiator is ESACURE ONE.

The photo-initiator may be selected from a group consisting of diphenyl (2,4,6-trimethylbenzoyl) phosphine oxide, benzophenone, ESACURE® KTO, IRGACURE® 184, IRGACURE® 500, DARACUR® 1173, Lucirin® TPO, 1-hydroxycyclohexyl phenyl ketone, 2-hydroxy-2-methyl-1-phenyl-propan-1-one, 2,4,6,-trimethylbenzophenone, 4-methylbenzophenone, oligo (2-hydroxy-2-methyl-1-(4-(1-methylvinyl)phenyl)propanone), and combinations thereof. In addition, the photo-initiators may be selected from a group consisting of phosphine oxide type photoinitiators, diphenyl (2,4,6-trimethylbenzoyl) phosphine oxide, benzophenone, 1-hydroxycyclohexyl phenyl ketone, 2-hydroxy-2-methyl-1-phenyl-propan-1-one (DAROCUR® 1173 from Ciba Specialty Chemicals 540 White Plains Road, Tarrytown, N.Y., U.S.A.)), 2,4,6-trimethylbenzophenone and 4-methylbenzophenone, ESACURE® KTO 46 (Lamberti S.p.A., Gallarate (VA), Italy), oligo(2-hydroxy-2-methyl-1-(4-(1-methylvinyl)phenyl)propanone), amine acrylates, thioxanthones, benzyl methyl ketal, and mixtures thereof. Furthermore, the photo-initiators may be selected from 2-hydroxy-2-methyl-1-phenyl-propan-1-one (DAROCUR® 1173 from Ciba Specialty Chemicals 540 White Plains Road, Tarrytown, N.Y., U.S.A.), phosphine oxide type photoinitiators, IRGACURE (D 500, 819, or 1700 (Ciba Specialty Chemicals 540 White Plains Road, Tarrytown, N.Y., U.S.A.), amine acrylates, thioxanthones, benzyl methyl ketal, ESACURE® ONE, and mixtures thereof.

Other photo-initiators which are suitable for use in the practice of the present invention include, but are not limited to, 1-phenyl-2-hydroxy-2-methyl-1-propanone, oligo {2-hydroxy-2 methyl-1-4-(methylvinyl)phenylpropanone)}, 2-hydroxy 2-methyl-1-phenyl propan-1 one, bis (2,6-dimethoxybenzoyl)-2,4,4-trimethylpentyl phosphine oxide, 1-hydroxycyclohexyl phenyl ketone and benzophenone as well as mixtures thereof. Still other useful photoinitiators include, for example, bis(n,5,2,4-cyclopentadien-1-yl)-bis 2,6-difluoro-3-(1H-pyrol-1-yl) phenyl titanium and 2-benzyl-2-N,N-dimethyl amino-1-(4-morpholinophenyl)-1-butanone. These compounds are IRGACURE® 784 and IRGACURE® 369, respectively (both from Ciba Specialty Chemicals 540 White Plains Road, Tarrytown, N.Y., U.S.A.) While, still other useful photoiniators include, for example, 2-methyl-1-4(methylthio)-2-morpholinopropan-1-one, 4-(2-hydroxy) phenyl-2-hydroxy-2-(methylpropyl)ketone, 1-hydroxy cyclohexyl phenyl ketone benzophenone, (cyclopentadienyl)(1 methylethyl)benzene-iron hexafluorophosphate, 2,2-dimemoxy-2-phenyl-1-acetophen-one 2,4,6-trimethyl benzoyl-diphenyl phosphine oxide, benzoic acid, 4-(dimethyl amino)-ethyl ether, as well as mixtures thereof.

In a further or alternative embodiment, a coating composition disclosed herein further comprises at least one photo-initiator comprising ce-hydroxyketone, such as 1-hydroxy-cyclohexyl-phenyl-ketone. In another or alternative embodiment, a coating composition disclosed herein further comprises at least one photo-initiator comprising benzophenone. In another or alternative embodiment, a coating composition disclosed herein further comprises at least one photo-initiator comprising a benzoyl diaryl phosphine, such as 2,4,6-trimethylbenzoyl)diphenylphosphine oxide.

In an embodiment, a coating composition disclosed herein further comprises a combination of photo-initiators. In an embodiment, a coating composition disclosed herein further comprises IRGACURE® 184 and IRGACURE® 500. In another embodiment, a coating composition disclosed herein further comprises IRGACURE® 184, IRGACURE® 500, and Lucirin® TPO.

The photo-initiator(s) are present in a coating composition disclosed herein in any suitable amount including, e.g., an amount ranging from 0.5-10% wt/wt, such as from 1 to 9% wt/wt, 3 to 8% wt/wt, or 4 to 6% wt/wt. In another embodiment, a coating composition disclosed herein further comprises a combination of photo-initiators, wherein each photo-initiator is present in an amount ranging from 0.5-5% wt/wt, such as from 1 to 4% wt/wt or 2 to 3% wt/wt. In yet another embodiment, a coating composition disclosed herein further comprises IRGACURE® 184 in an amount ranging from 2 to 6% wt/wt, such as about 2, 3, 4, 5, or 6% wt/wt and IRGACURE® 500 in an amount ranging from 0.5 to 4% wt/wt, such as about 0.5, 1, 2, 3, or 4% wt/wt.

In an embodiment, a coating composition disclosed herein further comprises a pigment (e.g., a pigment dispersion). In further embodiments, such compositions optionally comprise a second photo-initiator comprising benzoyl diaryl phosphine oxide. Although the presence of pigments can absorb radiation both in the UV and visible light regions and reduce the effectiveness of some types of photo-initiators, phosphine oxide type photo-initiators are effective in pigmented composition, including, by way of example only, black and UV-curable coating materials. Phosphine oxides also find use as photo-initiators for white coatings. In certain embodiments, a coating composition disclosed herein further comprises a pigment dispersion and a photo-initiator comprising 2,4,6-trimethylbenzoyl)diphenylphosphine oxide, such as Lucirin® TPO.

In an embodiment, a coating composition disclosed herein further comprises a photo-initiator comprising benzoyl diaryl phosphine oxide that is present in an amount ranging from 0.5-5% wt/wt, such as from 1 to 4% wt/wt or 2 to 3% wt/wt. hi an embodiment, the photo-initiator comprising benzoyl diaryl phosphine oxide may be present in the composition in an amount of about 0.5, 1, 2, 3, or 4% wt/wt.

Surfactants

Where the coating or coated article is intended to be safe for human consumption or safe for contact with food, any surfactant utilized must be safe for human consumption or safe for contact with food.

In some embodiments, a coating composition disclosed herein further comprises at least one surfactant. Examples of surfactants include, but are not limited to, polymers such as polystyrene, polypropylene, polyesters, styrene-methacrylic acid type copolymers, styrene-acrylic acid type copolymers, polytetrafluoroethylene, polychlorotrifluoroethylene, polyethylenetetrafluoroethylene type copolymers, polyaspartic acid, polyglutamic acid, and polyglutamic acid-γ-methyl esters, and modifiers such as silane coupling agents and alcohols. Additional surfactants include olefins, such as polyethylene, polypropylene, polybutadiene, and the like; vinyls, such as polyvinylchloride, polyvinylesters, polystyrene; acrylic homopolymers and copolymers; phenolics; amino resins; alkyds, epoxys, siloxanes, nylons, polyurethanes, phenoxys, polycarbonates, polysulfones, polyesters (optionally chlorinated), polyethers, acetals, polyimides, and polyoxyethylenes. Further exemplary surfactants include crosslinked as well as non-crosslinked acrylates that are compatible with UV curing compositions, such as crosslinkable silicone acrylate.

Exemplary surfactants include those manufactured under the name TEGO® Rad by Degussa AG (Essen, Germany) and include TEGO® Rad 2100, 2200, 2250, 2300, 2500, 2600, 2650, and 2700. In various embodiments, the surfactant(s) are present in a compositions in any suitable amount including, e.g., in an amount ranging from 0.01-2.0% wt/wt, such as about 0.01, 0.02, 0.03, 0.04, 0.05, 0.06, 0.07, 0.08, 0.09, 1.0, 1.2, 1.4, 1.6, 1.8, or 2.0% wt/wt.

Diluents

Where the coating or coated article is intended to be safe for human consumption or safe for contact with food, any diluent utilized must be safe for human consumption or safe for contact with food.

In some embodiments, a coating composition disclosed herein further comprises at least one diluent. In an embodiment, the diluent is appropriate for diluting oligomers, e.g., as a diluting monomeric unit. In another embodiment, a coating composition disclosed herein further comprises a reactive diluent that produces polymers through the formation of free radicals when exposed to a source of actinic radiation, such as ultraviolet light.

Representative diluents include, but are not limited to, isobornyl acrylate, isodecyl acrylate, trimethylolpropane triacrylate (TMPTA), di-trimethylolpropane triacrylate (Di-TMPTA), propoxylated TMPTA (PO6-TMPTA), and combinations or monomeric units thereof. In certain embodiments, diluents that may be employed in the present composition are also categorized as mono-functional or multi-functional monomeric units, described and listed herein.

In certain embodiments, a coating composition disclosed herein further comprises at least one diluent in an amount ranging from 2-20% wt/wt, such as from 5 to 18% wt/wt, 7 to 15% wt/wt, or 10 to 12% wt/wt. In an embodiment, a coating composition disclosed herein further comprises isobornyl acrylate in an amount ranging from 2-20% wt/wt, such as from 5 to 18% wt/wt, 7 to 15% wt/wt, or 10 to 12% wt/wt.

Pigments and Pigment Dispersions

Where the coating or coated article is intended to be safe for human consumption or safe for contact with food, any pigment or pigment dispersion utilized must be safe for human consumption or safe for contact with food.

In some embodiments, a coating composition disclosed herein optionally comprises at least one pigment or pigment dispersion. In various embodiments, pigments, are insoluble white, black, or colored material, e.g., PC 9003 (white bonded pigment).

Various organic pigments are used with a composition described herein, including, but not limited to, carbon black, azo-pigment, phthalocyanine pigment, thioindigo pigment, anthraquinone pigment, flavanthrone pigment, indanthrene pigment, anthrapyridine pigment, pyranthrone pigment, perylene pigment, perynone pigment and quinacridone pigment.

Various inorganic pigments are used with a composition described herein, for example, but not limited to, titanium dioxide, aluminum oxide, zinc oxide, zirconium oxide, iron oxides: red oxide, yellow oxide and black oxide, Ultramarine blue, Prussian blue, chromium oxide and chromium hydroxide, barium sulfate, tin oxide, calcium, titanium dioxide (rutile and anatase titanium), sulfate, talc, mica, silicas, dolomite, zinc sulfide, antimony oxide, zirconium dioxide, silicon dioxide, cadmium sulfide, cadmium selenide, lead chromate, zinc chromate, nickel titanate, clays such as kaolin clay, muscovite and sericite.

In various embodiments, a coating composition disclosed herein optionally comprises at least one pigment or pigment dispersion in an amount ranging from 1-12% wt/wt, such as from 3 to 10% wt/wt, or 5 to 9% wt/wt.

Miscellaneous

In some embodiments, a coating composition disclosed herein further comprises a natural gum, a flavoring agent, a dye, a de-foaming agent, or a combination thereof.

In some embodiments, a coating composition disclosed herein further comprises a natural gum. In some embodiments, the gum is arabic gum, karaya gum, locust bean gum, tragacanth gum, carrageens gum, guar gum, xanthan gum, scleroglucan gum.

In some embodiments, a coating composition disclosed herein further comprises a flavoring agent. In some embodiments, the flavoring agent is maltodextrin or an oil. In some embodiments, the flavoring agent is an essential oil. In some embodiments, the flavoring agent is acacia syrup, acesulfame K, alitame, anise, apple, aspartame, banana, bavarian cream, berry, black currant, butterscotch, calcium citrate, camphor, caramel, cherry, cherry cream, chocolate, cinnamon, bubble gum, citrus, citrus punch, citrus cream, cotton candy, cocoa, cola, cool cherry, cool citrus, cyclamate, cylamate, dextrose, eucalyptus, eugenol, fructose, fruit punch, ginger, glycyrrhetinate, glycyrrhiza syrup, grape, grapefruit, honey, isomalt, lemon, lime, lemon cream, monoammonium glyrrhizinate, maltol, mannitol, maple, marshmallow, menthol, mint cream, mixed berry, neohesperidine DC, neotame, orange, pear, peach, peppermint, peppermint cream, raspberry, root beer, rum, saccharin, safrole, sorbitol, spearmint, spearmint cream, strawberry, strawberry cream, stevia, sucralose, sucrose, sodium saccharin, saccharin, aspartame, acesulfame potassium, mannitol, talin, sylitol, sucralose, sorbitol, swiss cream, tagatose, tangerine, thaumatin, tutti fruitti, vanilla, walnut, watermelon, wild cherry, wintergreen, xylitol, or any thereof.

In some embodiments, a coating composition disclosed herein further comprises an anti-foaming agent. As used herein, an "anti-foaming agent" is an agent that reduces foaming. Where the coating or coated article is intended to be GRAS, any anti-foaming agent utilized must be GRAS. Exemplary anti-foaming agents include silicon emulsions, sorbitan sesquoleate, vegetable oils, or combinations thereof. In some embodiments, the anti-foaming agent is canola oil, grapeseed oil, olive oil, sunflower oil, corn oil, or a combination thereof.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for preparing a coated article, comprising:
   (a) coating a substrate with a composition comprising:
      (i) a polypeptide, wherein the polypeptide is selected from the group consisting of: albumin, transferrin, ovomucin, lysozyme, or combinations thereof and
      (ii) a denaturing agent; and
   (b) curing and cross-linking the composition by exposing the composition to shortwave actinic radiation to form a coated article;
   wherein the temperature of the composition during the curing process is less than about 70° C.; and
   wherein the composition does not coagulate during the curing process.

2. The method of claim 1, wherein the composition further comprises a polar solvent.

3. The method of claim 1, wherein the polar solvent is water.

4. The method of claim 1, wherein the composition is safe for human consumption, safe for contact with food, or a combination thereof.

5. The method of claim 1, wherein the curing comprises exposing the composition to actinic radiation having a wavelength from about 200 nm to about 400 nm.

6. The method of claim 1, wherein the curing comprises exposing the composition to actinic radiation having a wavelength of about 280 nm.

7. The method of claim 1, wherein the composition further comprises an acid.

8. The method of claim 1, wherein the composition further comprises: 2,3-dihydroxysuccinic acid; ethanoic acid; 3-hydroxypentanedioic acid; salts thereof; partial salts thereof; or combinations thereof.

9. The method of claim 1, wherein the polar solvent has a pH of about 7 or below.

10. The method of claim 1, wherein the composition further comprises a natural gum, a flavoring agent, a dye, a de-foaming agent, or a combination thereof.

11. The method of claim 1, wherein the composition further comprises maltodextrin, an oil, or a combination thereof.

12. The method of claim 1, wherein the substrate is paper, plastic, metal, food, or a combination thereof.

13. The method of claim 1, wherein the polypeptide is provided in the form of a powder.

14. A coated article comprising:
   (a) a substrate; and
   (b) a polypeptide composition, wherein the polypeptide composition comprises a polypeptide from the group consisting of: albumin, transferrin, ovomucin, lysozyme, or combinations thereof coating the substrate; and
   wherein the polypeptide composition is cross-linked after coating the substrate; and
   wherein the polypeptide composition is not coagulated.

15. The coated article of claim 14, wherein the polypeptide composition further comprises a polar solvent.

16. The coated article of claim 14, wherein the polypeptide composition further comprises water.

17. The coated article of claim 14, wherein the polypeptide composition further comprises a denaturing agent.

18. The coated article of claim 14, wherein the polypeptide composition is safe for human consumption, safe for contact with food, or a combination thereof.

19. The coated article of claim 14, wherein cross-linking the polypeptide composition comprises exposing the polypeptide composition to shortwave actinic radiation.

20. The coated article of claim 14, wherein cross-linking the polypeptide composition comprises exposing the polypeptide composition to actinic radiation having a wavelength from about 200 nm to about 400 nm.

21. The coated article of claim 14, wherein cross-linking the polypeptide composition comprises exposing the polypeptide composition to actinic radiation having a wavelength of about 280 nm.

22. The coated article of claim 14, wherein the polypeptide composition further comprises an acid.

23. The coated article of claim 14, wherein the polypeptide composition further comprises: 2,3-dihydroxysuccinic acid; ethanoic acid; 3-hydroxypentanedioic acid; salts thereof; partial salts thereof; or combinations thereof.

24. The coated article of claim 14, wherein the polar solvent has a pH of about 7 or below.

25. The coated article of claim 14, wherein the polypeptide composition further comprises a natural gum, a flavoring agent, a dye, a de-foaming agent, or a combination thereof.

26. The coated article of claim 14, wherein the polypeptide composition further comprises maltodextrin, an oil, or a combination thereof.

27. The coated article of claim 14, wherein the substrate is impregnated with the composition.

28. The coated article of claim 14, wherein the substrate is paper, plastic, metal, food, or a combination thereof.

29. The coated article of claim 14, wherein the polypeptide is in the form of a powder.

30. A method for preparing a coated article, comprising:
(a) coating a substrate with a composition comprising:
   (i) a monomer, an oligomer, or a combination thereof; and
   (ii) a polypeptide, wherein the polypeptide is selected from the group consisting of: albumin, transferrin, ovomucin, lysozyme, or combinations thereof; and
(b) curing and cross-linking the composition by exposing the composition to shortwave actinic radiation to form a coated article;
wherein the temperature of the composition during the curing process is less than about 70° C.; and
wherein the composition does not coagulate during the curing process.

31. The method of claim 30, wherein the composition is safe for human consumption, safe for contact with food, or a combination thereof.

32. The method of claim 30, wherein the monomer is trimethylolpropane triacrylate (TMPTA), ethoxylated TMPTA (TMPTEOA), tripropylene glycol diacrylate (TR-PGDA), or a combination thereof.

33. The method of claim 30, wherein the oligomer is epoxy diacrylate.

34. The method of claim 30, wherein the composition further comprises: a photoinitiator, a diluent, a surfactant, a pigment dispersion, a natural gum, a dye, a de-foaming agent, or a combination thereof.

35. The method of claim 30, wherein the composition further comprises maltodextrin, an oil, or a combination thereof.

36. The method of claim 30, wherein the curing comprises exposing the composition to actinic radiation having a wavelength from about 200 nm to about 400 nm.

37. The method of claim 30, wherein the curing comprises exposing the composition to actinic radiation having a wavelength of about 280 nm.

38. The method of claim 30, wherein coating comprises impregnating the substrate with the composition.

39. The method of claim 30, wherein the substrate is paper, plastic, metal, food, or a combination thereof.

40. The method of claim 30, wherein the polypeptide is in the form of a powder.

41. A coated article comprising:
(a) a substrate; and
(b) a composition coating the substrate comprising:
   (i) a cross-linked monomer, an oligomer, or a combination thereof; and
   (ii) a polypeptide, selected from the group consisting of: albumin, transferrin, ovomucin, lysozyme, or combinations thereof;
wherein the composition is cross-linked after coating the substrate; and
wherein the composition is not coagulated.

42. The coated article of claim 41, wherein the composition is safe for human consumption, safe for contact with food, or a combination thereof.

43. The coated article of claim 41, wherein the monomer is trimethylolpropane triacrylate (TMPTA), ethoxylated TMPTA (TMPTEOA), tripropylene glycol diacrylate (TR-PGDA), or a combination thereof.

44. The coated article of claim 41, wherein the composition further comprises: a diluent, a surfactant, a pigment dispersion, a natural gum, a flavoring agent, a dye, a de-foaming agent, or a combination thereof.

45. The coated article of claim 41, wherein the composition further comprises maltodextrin, an oil, or a combination thereof.

46. The coated article of claim 41, wherein cross-linking the composition comprises exposing the composition to shortwave actinic radiation.

47. The coated article of claim 41, wherein cross-linking the composition comprises exposing the composition to actinic radiation having a wavelength from about 200 nm to about 400 nm.

48. The coated article of claim 41, wherein cross-linking the composition comprises exposing the composition to actinic radiation having a wavelength of about 280 nm.

49. The coated article of claim 41, wherein the substrate is impregnated with the composition.

50. The coated article of claim 41, wherein the substrate is paper, plastic, metal, food, or a combination thereof.

51. The coated article of claim 41, wherein the polypeptide is provided in the form of a powder.

* * * * *